US012711375B2

(12) United States Patent
Rhodes et al.

(10) Patent No.: US 12,711,375 B2
(45) Date of Patent: Aug. 18, 2026

(54) NEURAL FEATURE SELECTION AND FEATURE INTERACTION LEARNING

(71) Applicant: Intel Corporation, Santa Clara, CA (US)

(72) Inventors: Anthony Rhodes, Portland, OR (US); Hong Lu, Santa Clara, CA (US); Jose Lopez, Cambridge, MA (US); Lama Nachman, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/936,975

(22) Filed: Sep. 30, 2022

(65) Prior Publication Data

US 2023/0186080 A1 Jun. 15, 2023

(51) Int. Cl.
*G06N 3/08* (2023.01)

(52) U.S. Cl.
CPC .................................... *G06N 3/08* (2013.01)

(58) Field of Classification Search
CPC ........... G06N 3/08; G06N 3/09; G06N 3/0495
See application file for complete search history.

(56) References Cited

U.S. PATENT DOCUMENTS

| | | | | |
|---|---|---|---|---|
| 2019/0279089 | A1* | 9/2019 | Wang | G06N 3/082 |
| 2021/0264278 | A1* | 8/2021 | Liu | G06N 3/096 |
| 2023/0125897 | A1* | 4/2023 | Timmaraju | G06N 3/084<br>705/14.53 |
| 2024/0171452 | A1* | 5/2024 | Horemuz | H04L 41/0645 |

FOREIGN PATENT DOCUMENTS

| | | | | |
|---|---|---|---|---|
| WO | WO-2021178981 | A1 * | 9/2021 | G06N 3/082 |
| WO | WO-2021195643 | A1 * | 9/2021 | G06V 10/454 |
| WO | WO-2021195644 | A1 * | 9/2021 | G06N 3/045 |

OTHER PUBLICATIONS

F. M. Nardini, C. Rulli, S. Trani and R. Venturini, "Distilled Neural Networks for Efficient Learning to Rank," in IEEE Transactions on Knowledge and Data Engineering, vol. 35, No. 5, pp. 4695-4712, May 1, 2023, doi: 10.1109/TKDE.2022.3152585.*

(Continued)

*Primary Examiner* — Asher D Kells
(74) *Attorney, Agent, or Firm* — Nicholson DeVos Webster & Elliott LLP

(57) ABSTRACT

Data analysis and neural network training technology includes generates, based on a sparse neural network, a feature selection ranking representing a ranked list of features from input data, where the sparse neural network is a shallow neural network trained with the input data and then pruned, generates, based on the sparse neural network, a feature set dictionary representing interactions among features from the input data, and performs, based on the feature selection ranking and the feature set dictionary, one or more of generating an output analysis of insights from the input data and the sparse neural network, or training of a second neural network. The technology can also adjust the input data based on the feature set ranking to produce adjusted input data, where the sparse neural network is re-trained based on the adjusted input data and then pruned prior to generating the feature set dictionary.

25 Claims, 10 Drawing Sheets

(56) References Cited

OTHER PUBLICATIONS

Frankle et al., “The Lottery Ticket Hypothesis: Finding Sparse, Trainable Neural Networks”, <openreview.net/pdf?id=rJI-b3RcF7>, May 2019, 43 pages.
Malach et al., “Proving the Lottery Ticket Hypothesis: Pruning is All You Need,” <arxiv.org/pdf/2002.00585v1.pdf>, Feb. 3, 2020, 23 pages.
Ng, “Unbiggen AI” <spectrum.ieee.org/andrew-ng-data-centric-ai>, Feb. 9, 2020, 10 pages.
Purushotham et al., “Factorized Sparse Learning Models with Interpretable High Order Feature Interactions”, <cs.toronto.edu/~cuty/KDD2014.pdf>, 2014, 10 pages.
Sorokina et al., “Additive Groves of Regression Trees”, <khoury.northeastern.edu/~mirek/papers/2007-ECML-Groves.pdf>, 2007, 12 pages.
Tibshirani, “Regression Shrinkage and Selection via the Lasso”, <http://homepages.math.uic.edu/~lreyzin/papers/lasso.pdf>, 1996, 22 pages.

* cited by examiner

400A

```
for w_j ∈ W^(1) (row j):
    for i_order=2 to M:
        indices ← abs(w_j[sort(i_order)])
        dict[indices] ← dict[indices] + score(indices)
return dict
```

60
Processing Element
70
99a
Proc.
Core
74b
74a
Memory
62
MC
72
76
78
P-P
P-P
71
Processing Element
80
99b
Proc.
Core
84b
84a
88
86
MC
82
Memory
63
P-P
P-P
Battery
61
94
P-P
IO Subsystem
90
P-P
98
73
High-Perf.
Graphics
64
I/F
92
I/F
96
65
Bus Bridge
66
IO Devices
65a
Audio IO
67c
67
Keyboard/Mouse
67a
Comm. Devices
67b
69
Data Storage
68
Code

NEURAL FEATURE SELECTION AND FEATURE INTERACTION LEARNING

TECHNICAL FIELD

Embodiments generally relate to computing systems. More particularly, embodiments relate to a performance enhanced data analysis system with improved feature selection and feature interaction learning for data analysis and neural network training.

BACKGROUND

Today, in an era of data abundance, data are plentiful—but quality, human-interpretable data are much harder to come by. Prior attempts to perform meaningful data analyses that provide informative and interpretable features relevant to complex, real-world phenomena include techniques relating to feature selection or feature interactions. These techniques present several challenges, including computational intensity (complex and expensive computing-wise) and/or non-productivity (insufficient or unreliable results). For example, exhaustive pairwise interaction learning requires the explicit calculation of $O(p^2)$ interactions. Even in this low-order case of feature interaction learning, many techniques nevertheless rely on linear (or similar low-fidelity) operations as criteria for approximating feature interactions. More daunting still, higher-order feature interaction learning scales exponentially $O(2^p)$, presenting a significant impediment to interaction learning in large-scale datasets beyond mere feature pairs. For this reason, comprehensive higher-order interaction learning (beyond order 2) is generally avoided in practice, particularly in the case of high-dimensional data.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

An improved computing system as described herein provides an efficient and generalizable solution for data analysis including (i) importance ranking of data features for feature selection, and (ii) high-order feature interaction learning. As described herein, the technology leverages the power of neural networks, which traditionally serve as black box predictive models, to yield insights into large or complex datasets that facilitate explainability and trustability for complex processes and further support data efficiency for downstream tasks. The technology helps improve the overall performance of computing systems by providing efficient feature selection and feature interaction learning for data analysis and neural network training. By using a shallow neural network (NN) to concurrently perform feature selection and feature interaction learning of arbitrary order in conjunction with a NN training process, the technology supports a non-linear feature selection process capable of learning non-linear interactions of arbitrary order (e.g., 2, 3, 4, . . . ), which provides a robust set of feature interactions (e.g., correlations among different features). The technology thus obviates the need for exhaustive search while avoiding the need to limit to low-order (i.e., order 2) interactions.

The disclosed technology provides several advantages, such as enabling the ability to scale to large datasets of arbitrary order interaction learning while avoiding the exponential computational growth characteristic of prior efforts. This enables capturing many illuminating insights from data obtained e.g. via "big data" applications through efficient, higher-order interaction learning provided by the improvements described herein. Furthermore, the technology can be implemented in a seamless way by using pre-existing optimization and deep learning frameworks—as the technology is agnostic to the optimization algorithm used for model training and to the choice of training hyperparameters, while requiring only modest compute resources due to the requirement of a shallow NN. Indeed, the technology is applicable in principle to any dataset, and it is particularly suitable for high dimensional data and highly overdetermined real-world systems. Unlike traditional interaction learning approaches, the disclosed technology can render non-linear feature interactions, and it can be further adapted to a variety of diverse downstream tasks and objectives (e.g., one can simply augment the loss function used to train the NN). Finally, the approach described herein does not require the kind of fine-grain problem domain calibration required by classical feature selection and interaction learning methods.

Figure 1A:
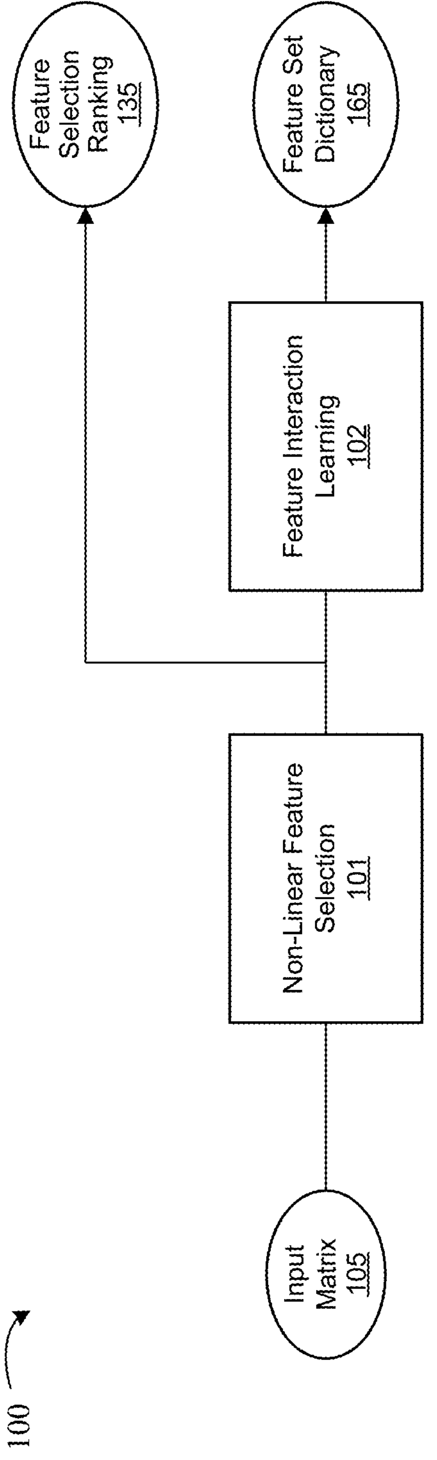
FIG. 1A-1D provide block diagrams illustrating examples of a data analysis system according to one or more embodiments.

FIG. 1A provides a block diagram illustrating an example of a data analysis system 100 according to one or more embodiments, with reference to components and features described herein including but not limited to the figures and associated description. The system 100 includes components to perform non-linear feature selection 101 and feature interaction learning 102. Operating on an input matrix 105, the system 100 produces a feature selection ranking 135 and a feature set dictionary 165, which are used for analysis and/or model training tasks.

The system 100 receives the input matrix 105, which is an input data set representing a matrix of dimension N×D, where each row (of N rows) represents a D-dimensional datum (e.g., D input features). The input matrix 105 can be comprised of large data sets having thousands or millions of data points. As one example, the input matrix 105 includes data relating an electronic component (e.g., a central processing unit, a memory device, etc.), where each row corresponds to data for features relating to the electronic component and its design, testing, manufacture, and/or performance, etc., and the different rows correspond to data (e.g., design, testing, manufacture, and/or performance, etc.), for different components (e.g., a set of components manufactured, tested and/or monitored). As another example, the input matrix 105 includes data relating to a medical condition, where each row corresponds to data for features relating to various patient attributes, test results, etc., and the different rows correspond to data for different (e.g., individual) persons/patients. As another example, the input matrix 105 includes data relating to industry quality control (QC) testing, e.g., where each row relates to testing data for a type of electronic device or component, and the different rows correspond to data for different individual devices or components.

The non-linear feature selection component 101 operates via training a shallow NN to produce the feature selection ranking 135, which represents a ranked list of features from the input data set (i.e., features from the input matrix 105). The feature interaction learning component 102 operates via the trained shallow NN or, alternatively, via re-training the shallow NN, to produce the feature set dictionary 165, which represents interactions among features from the input data set. Further details of the system 100 and its components and features are described herein with reference to FIGS. 1B-1D.

Figure 1B:
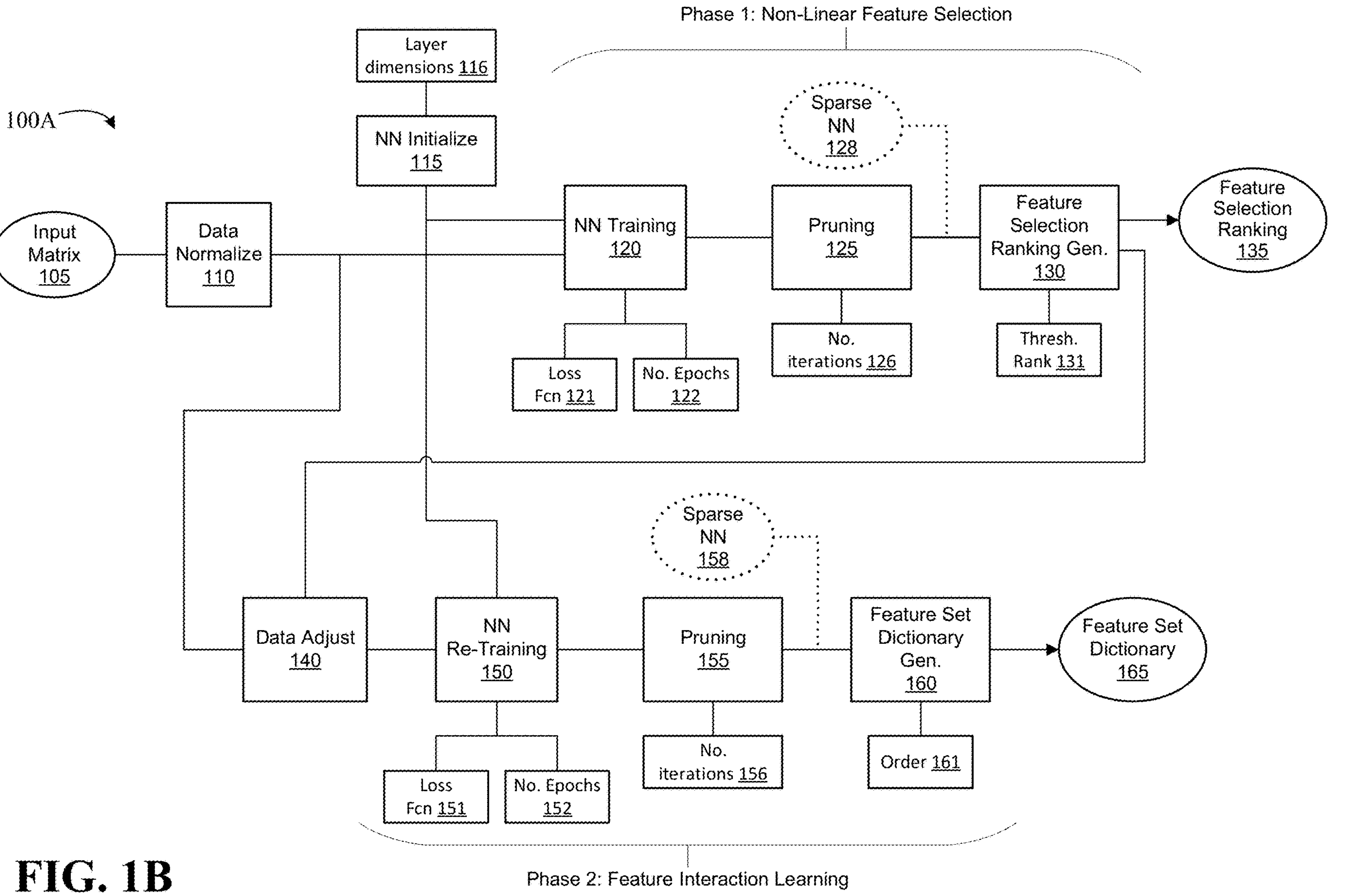

FIG. 1B provides a block diagram illustrating an example of a data analysis system 100A according to one or more embodiments, with reference to components and features described herein including but not limited to the figures and associated description. The system 100A receives the input matrix 105 (FIG. 1A, already discussed). As shown in FIG. 1B, the example system 100A comprises one or modules which can include a data normalizing module 110, a neural network (NN) initializing module 115, a neural network training module 120, a pruning module 125, a feature selection ranking generator 130, a data adjusting module 140, a neural network re-training module 150, a pruning module 155, and a feature set dictionary generator 160. The system 100A produces a feature selection ranking 135 (produced by operation of the feature selection ranking generator 130) and further produces a feature set dictionary 165 (produced by operation of the feature set dictionary generator 160). In embodiments, the system 100A further includes an action module 170 (as described further herein with reference to FIG. 1D). In embodiments, the system 100A corresponds to the system 100 (FIG. 1A, already discussed).

In embodiments, the data normalizing module 110 applies a pre-processing step to normalize the input matrix 105 to a range such as, e.g., the range [0, 1], which helps reduce or minimize NN sensitivity to large disparities in input data scale. In some embodiments, a standard minimax function is used to scale the input data the range [0, 1]. In some embodiments, additional preprocessing steps are applied to the input data to account for data labelling noise, missing values, and/or corrupted labels/information.

The neural network (NN) initializing module 115 performs set up and initialization of a shallow NN, which has a limited number of layers, all fully-connected. In some embodiments, the shallow NN is a NN having layers in the range of up to about ten layers—not including an input layer. For example, in embodiments the shallow neural network has a number of layers in the range of three to ten layers. The input layer is a layer providing the input data via neurons, each neuron representing a feature from the input data, and is fully connected to the first hidden layer in the shallow NN. In some embodiments, the shallow NN can be, for example, a three-layer network (not including the input layer). The layer dimensions 116 can include a number of layers and a per-layer dimension, and in some embodiments are user-selectable parameters. As one example, for a three-layer NN the dimensions for the layers can be 250 neurons (e.g., nodes), 100 neurons, and one neuron, respectively, where the last layer represents an output layer. Other layer dimensions can be used. For example, for a binary classification task, the output layer would typically have a single neuron, and for a multi-class classification task, the output layer can have a plurality of neurons (e.g., one output neuron for each class). The layer dimensions can be dependent on, e.g., the dimensionality (D) of the input matrix 105. For example, the input layer and/or the first hidden layer can be the same as the dimensionality (D) of the input matrix 105. The number of layers in a second hidden layer can be chosen to provide a significantly-sized feature set dictionary. The shallow NN can be of a variety of architectures. Typically, the layers of the initialized shallow NN are fully connected. In some embodiments, the NN architecture can be fine-tuned to elicit optimal performance.

Phase 1: Non-Linear Feature Selection.

The neural network training module 120, the pruning module 125, and the feature selection ranking generator 130 collectively perform operations that provide for non-linear feature selection. The neural network training module 120 trains the shallow NN using the input data set from the input matrix 105 (which may be normalized by the data normalizing module 110). In embodiments, the neural network training module 120 includes a standard neural network training algorithm (such as, e.g., a stochastic gradient descent algorithm) used to train a shallow neural network of varying architecture, applying a loss function 121 during training. Using the loss function 121, the NN training module 120 trains the shallow NN to completion for the desired number of epochs 122, where an epoch represents a training run with the full training data set (based on the input matrix 105). In embodiments, the number of epochs 122 can range up to 100. In embodiments, any one of a variety of NN training loss functions can be used for the loss function 121. In some embodiments, the loss function 121 is a hybrid loss function that incorporates a standard Binary Cross-Entropy (BCE) loss with an additional penalty for minority class misclassification, as defined by equation (1):

$$L = \underbrace{-\frac{1}{n}\sum_{i=1}^{n} y_i \log(p_i) + (1-y_i)\log(1-p_i)}_{BCE} + \lambda \underbrace{\sum_{y_i \in fail} (p_i - y_i)}_{fail\ class\ penalty} \tag{1}$$

where $p_i$ denotes the probability predicted by the model for "class" for the input datum; y is a one-hot encoding of the ground-truth label, meaning that $y_i=1$ for the true class and $y_i=0$ otherwise; and λ is a tunable hyperparameter. Such a loss function is useful for dealing with highly imbalanced class data.

In embodiments, the pruning module 125 operates to prune (e.g., remove or eliminate) edges (e.g., branches) of the trained shallow NN to yield a sparse NN 128. In embodiments, the pruning is based on the respective weights assigned to the edges by training the NN. In some embodiments, the pruning is applied multiple times (or in multiple stages), based on a number of iterations parameter 126. In some embodiments, iterative magnitude pruning is applied for a number of rounds based on the number of iterations parameter 126 to yield the sparse NN 128. Further details regarding iterative magnitude pruning are provided with reference to FIG. 2 herein.

In one example, the number of edges of the trained shallow NN is reduced by up to approximately 90% based on pruning. At this upper level of pruning, this leaves approximately 10% of the edges remaining in the trained shallow NN after pruning—resulting in the sparse NN 128 (in this example, 90% pruning gives a very sparse NN). In another example, the number of edges of the trained shallow NN is reduced by approximately 80% based on pruning, which leaves approximately 20% of the edges remaining in the sparse NN 128. In one or more examples, a range of approximately 80%-90% pruning yields a comparably performant sparse NN. By pruning to obtain a sparse NN 128, the sparse NN induces combinatorial bottlenecks that further enhance feature processing. Nevertheless, substantial pruning yields sparse NNs demonstrating minimal model performance degradation compared to unpruned NNs.

The feature selection ranking generator 130 generates a feature selection ranking representing a ranked list of features (i.e., features from the input matrix 105) based on the sparse NN 128. The ranked list is generated, in some embodiments, based on weights between neurons in the input layer and neurons in a first hidden layer of the sparse NN 128. The feature selection ranking represents, in embodiments, a set of the top ranked features obtained by taking the top-k ranked features, where k represents a threshold ranking parameter 131. As one example, the threshold ranking parameter 131 (e.g., k) is set to 50, meaning that the feature selection ranking represents a set of the top 50 ranked features in this example. In another example, threshold ranking parameter 131 (e.g., k) is set to 100, meaning that the feature selection ranking represents a set of the top 100 ranked features in this example. The result is a feature selection ranking 135 that is used in subsequent processing by the system 100A. Further details regarding generating a feature selection ranking via the feature selection ranking generator 130 are provided with reference to FIG. 3 herein.

In embodiments, the data adjusting module 140 uses the feature selection ranking 135 to modify the input data (e.g., the input matrix 105 or the input data from the input matrix 105 after processing via the data normalizing module 110). The input data is modified by selecting the top-k ranked features (as represented in the feature selection ranking 135) to obtain an adjusted input data set. That is, only those data points for features in the top k features (e.g., the k highest-ranked features) are retained in the adjusted input data set, and the other data points are discarded or ignored.

Phase 2: Feature Interaction Learning.

The neural network re-training module 150, the pruning module 155, and the feature set dictionary generator 160 collectively perform operations that provide for feature interaction learning. In embodiments, the neural network re-training module 150 uses the adjusted input data set from the data adjusting module 140 to re-train the shallow NN from scratch (e.g., re-train the shallow NN as provided by the NN initializing module 115), which provides for a more concise or compact model. The size of the input feature layer (e.g., the input layer) can be adjusted as necessary or appropriate, based on k. In embodiments, the neural network re-training module 150 includes a standard neural network training algorithm used to train a shallow neural network of varying architecture, applying a loss function 151 during training train the shallow NN to completion for the desired number of epochs 152. In some embodiments, the neural network re-training module 150 is the same as or corresponds to the neural network training module 120. In some embodiments, the loss function 151 is the same as or corresponds to the loss function 121. In some embodiments, number of epochs 152 is the same as or corresponds to the number of epochs 122.

In some embodiments, the pruning module 155 operates to prune (e.g., remove or eliminate) edges (e.g., branches) of the re-trained shallow NN to yield a sparse NN 158. In embodiments, the pruning is based on the respective weights assigned to the edges by re-training the NN. In some embodiments, the pruning is applied multiple times (or in multiple stages), based on a number of iterations parameter 156. In some embodiments, iterative magnitude pruning is applied for a number of rounds based on the number of iterations parameter 156 to yield the sparse NN 158. In one example, the number of edges of the re-trained shallow NN is reduced by approximately 90% based on pruning, which leaves approximately 10% of the edges remaining in the sparse NN 158. In another example, the number of edges of the re-trained shallow NN is reduced by approximately 80% based on pruning, which leaves approximately 20% of the edges remaining in the sparse NN 158. In some embodiments, the pruning module 155 is the same as or corresponds to the pruning module 125. In some embodiments, the number of iterations parameter 156 is the same as or corresponds to the number of iterations parameter 126.

The feature set dictionary generator 160 generates a feature set dictionary representing interactions among features from the input data set (i.e., features from the input matrix 105) based on the sparse NN 158. The feature set dictionary is generated, in some embodiments, by (a) identifying a plurality of unique feature interaction sets based on an order parameter 161 and on weights between neurons in the input layer and neurons in a first hidden layer of the sparse NN 158, and (b) determining a score for each of the feature interaction sets based on weights between neurons in the first hidden layer and neurons in a second hidden layer of the sparse NN 158. This utilizes the synaptic weights of the re-trained model for generating a dictionary of feature sets for each interaction order of interest: e.g., the order parameter 161 is set equal to 2 for pairwise interactions, the order parameter 161 is set equal to 3 for three-feature interactions, or the order parameter 161 is set equal to 4, 5, etc. for higher-order interactions. The result is a feature set dictionary 165 that is used in subsequent processing by the system 100A. Further details regarding generating a feature set dictionary via the feature set dictionary generator 160 are provided with reference to FIG. 4 herein.

Figures 1C, 1D:
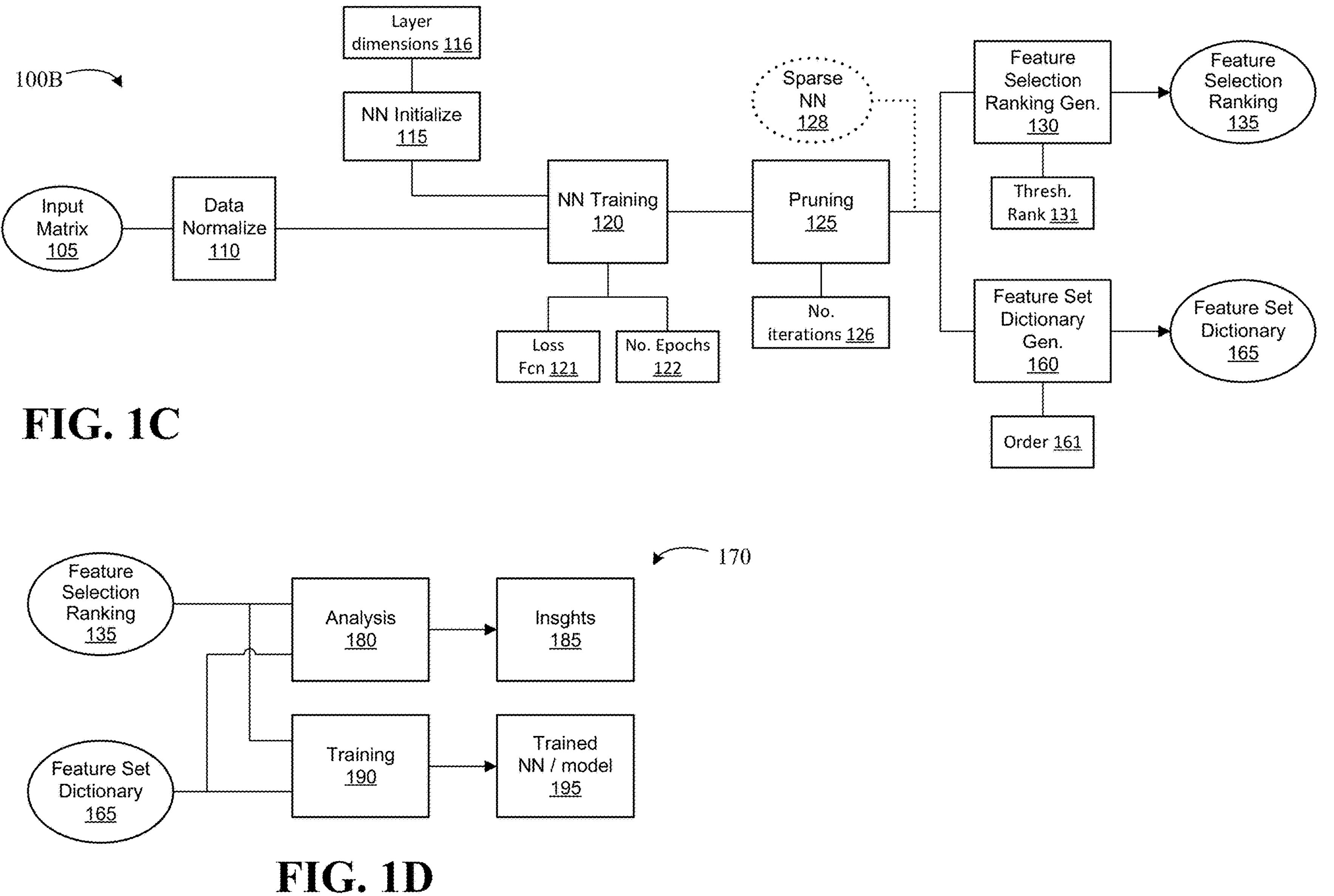

FIG. 1C provides a block diagram illustrating another example of a data analysis system 100B according to one or more embodiments, with reference to components and features described herein including but not limited to the figures and associated description. The system 100B includes several components and features the same as or similar to those in system 100A (FIG. 1B, already discussed), and description of those components and features will not be repeated except as necessary to describe the components, features or operation of the system 100B. In particular, the example system 100B receives the input matrix 105 (FIG. 1A, already discussed) and, as shown in FIG. 1C, comprises one or modules which can include a data normalizing module 110, a neural network (NN) initializing module 115, a neural network training module 120, a pruning module 125, a feature selection ranking generator 130, and a feature set dictionary generator 160. The system 100B produces a feature selection ranking 135 (produced by operation of the feature selection ranking generator 130) and further produces a feature set dictionary 165 (produced by operation of the feature set dictionary generator 160). In embodiments, the system 100B further includes an action module 170 (as described further herein with reference to FIG. 1D). In embodiments, the system 100B corresponds to the system 100 (FIG. 1A, already discussed).

The components of the system 100B operate in the same or similar manner to those same/similar components that are in the system 100A. The primary difference in the system 100B (as compared to the system 100A) is that the feature set dictionary generator 160 generates a feature set dictionary representing interactions among features from the input data set (i.e., features from the input matrix 105) based on the sparse NN 128 instead of the sparse NN 158 (as in the system 100A). In all other respects the feature set dictionary generator 160 operates the same in the system 100B as in the system 100A. The system 100B thus eliminates the data adjusting module 140, the neural network re-training module 150, and the pruning module 155, and therefore does not provide the sparse NN 158.

FIG. 1D provides a block diagram illustrating an example of an action module 170 according to one or more embodiments, with reference to components and features described herein including but not limited to the figures and associated description. The action module 170 comprises one or modules which can include an analysis module 180 and/or a NN training module 190. In embodiments the action module 170 is included with either the system 100A and/or the system 100B.

The analysis module 180 receives as input the feature selection ranking 135 (FIGS. 1A-1C, already discussed) and the feature set dictionary 165 (FIGS. 1A-1C, already discussed), and operates to provide insights 185. The insights 185 represent learnings about the features in the input data and the interactions between the features to provide model interpretability, e.g., identifying those features and interactions providing the most important (e.g., predictive) information. For example, the insights 185 can identify factors that are likely to be associated with a particular outcome or result (e.g., a desirable outcome or an undesirable outcome). For example, the insights can relate to physical phenomena and/or or physical properties of a product (e.g., an apparatus, component, material, etc.) and/or or to procedures for manufacturing, testing or use of a product, etc. As one example, where the input data relates to design of an electronic component, the insights 185 can identify physical phenomena or physical properties that are likely to be associated with successful manufacture of the component. As another example, where the input data relates to testing for an electronic component, the insights 185 can identify aspects of a test procedure that are associated with eliminating unsatisfactory components. For example, data feature and feature interaction insights can be leveraged to identify likely defect sources; these insights can similarly be leveraged to make testing processes more efficient, e.g., to sequentially order tests that identify the statistically most important and/or highly interactive features.

The training module 190 operates to train a neural network or other machine learning model using the feature selection ranking 135 and the feature set dictionary 165 as the input layer (e.g., input) for training. The training module 190 is used to train any type of neural network (e.g., not limited to a shallow NN) or other machine learning model, of arbitrary size or configuration, and produces a trained NN/model 195. Because the training module 190 uses the feature selection ranking 135 and the feature set dictionary 165—representing the most important features and feature interactions for the input data set—as the input (e.g., input layer) for training, the training process can be accomplished in a quick, efficient manner, and the resulting trained NN/model 195 is a lighter, more efficient NN/model.

Some or all components or features in the system 100 (FIG. 1A), the system 100A (FIGS. 1B and 1D) and/or the system 100B (FIGS. 1C and 1D) can be implemented using one or more of a central processing unit (CPU), a graphics processing unit (GPU), an artificial intelligence (AI) accelerator, a field programmable gate array (FPGA) accelerator, an application specific integrated circuit (ASIC), and/or via a processor with software, or in a combination of a processor with software and an FPGA or ASIC. More particularly, components of the system 100, the system 100A and/or the system 100B can be implemented in one or more modules as a set of program or logic instructions stored in a machine- or computer-readable storage medium such as random access memory (RAM), read only memory (ROM), programmable ROM (PROM), firmware, flash memory, etc., in hardware, or any combination thereof. For example, hardware implementations can include configurable logic, fixed-functionality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured ASICs, combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out operations by the system 100, the system 100A and/or the system 100B can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 2:
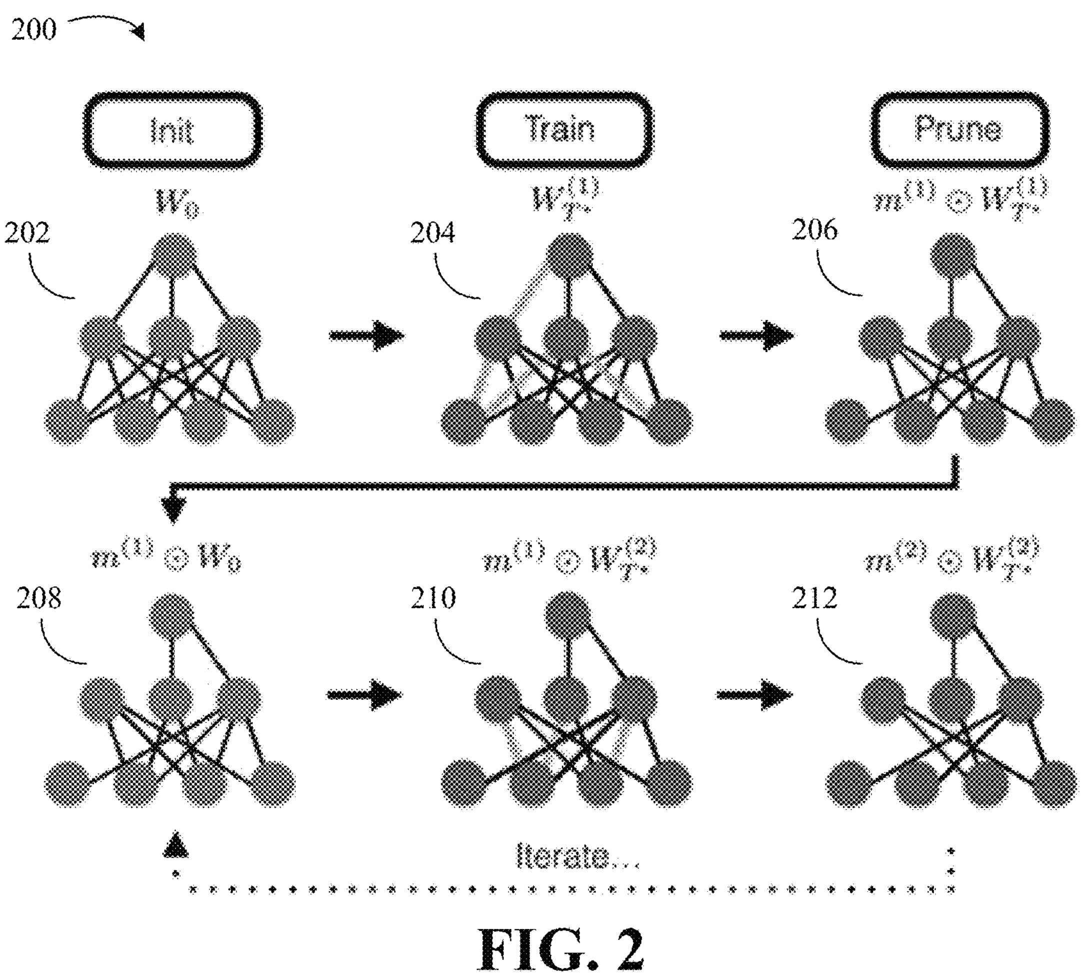
FIG. 2 provides a diagram illustrating an example process for pruning a neural network according to one or more embodiments.

FIG. 2 provides a diagram illustrating an example pruning process 200 according to one or more embodiments, with reference to components and features described herein including but not limited to the figures and associated description. The example process 200 illustrated in FIG. 2 is based on an iterative magnitude pruning process, as applied to a shallow NN. The process 200 can generally be implemented in the pruning module 125 (FIGS. 1B-1C, already discussed) and/or the pruning module 155 (FIG. 1B, already discussed). More particularly, the process 200 can be implemented in one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out the process 200 can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

As shown in FIG. 2, the process 200 begins with an initialized NN with edge weights $W_0$ at label 202, which in embodiments is a fully connected, shallow NN. The initialized NN is trained (using an input data set) in the first round at label 204, such that the edges have weights $W_T^{(1)}$ ("$^{(1)}$" denoting the first round or iteration of pruning) determined by the training process. At label 206, the synaptic edges $W_T^{(1)}$ with the smallest absolute magnitude (excluding zero-weight edges) are pruned (e.g., removed) from the trained NN, with the remaining edges forming a mask $m^{(1)}$ having elements {0, 1} for the first pruning round.

The pruning can apply a pruning rate such that a percentage of edges (pruning rate) are pruned at each round. At label 208, round 2 begins where the mask $m^{(1)}$ is applied to the initialized NN $W_0$ and then optionally re-trained at label 210 to provide new edge weights $W_T^{(2)}$. At label 212, the synaptic edges $W_T^{(2)}$ with the smallest absolute magnitude are pruned, with the remaining edges forming a mask $m^{(2)}$ having elements {0, 1} for the second pruning round. The process can be repeated for a desired number of rounds or iterations (e.g., as determined by the number of iterations parameter 126 in FIGS. 1B-1C and/or the number of iterations parameter 156 in FIG. 1B). In one example, a pruning rate schedule of 20% pruning for fully connected layers (excepting the output layer) and 10% pruning for the output layer of the network is applied. Other pruning rates can be applied.

Figure 3:
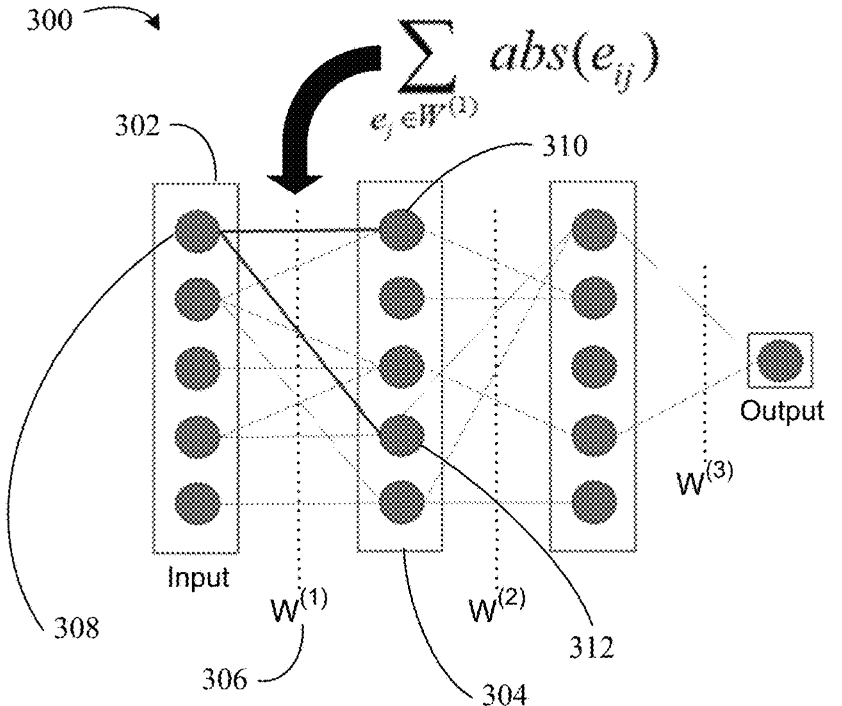
FIG. 3 provides a diagram illustrating an example process for generating a feature selection ranking according to one or more embodiments.

FIG. 3 provides a diagram illustrating an example process 300 for feature selection ranking according to one or more embodiments, with reference to components and features described herein including but not limited to the figures and associated description. The process 300 can generally be implemented in the feature selection ranking generator 130 (FIGS. 1B-1C, already discussed). More particularly, the process 300 can be implemented in one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out the process 300 can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The process 300 computes a feature selection score for each input feature using the sparse NN (e.g., the sparse NN 128 in FIGS. 1B-1C and/or the sparse NN 158 in FIG. 1B). In embodiments, the feature selection score is based on using the sum of out-degree (with respect to the network input layer) in absolute magnitude criterion, using the following equation (with reference to FIG. 3):

$$f_{rank}^{(i)} = \sum_{e_j \in W^{(1)}} \text{abs}(e_{ij}) \tag{2}$$

where $$f_{rank}^{(i)}$$

denotes a feature selection score of the $i^{th}$ input feature (a higher score connotes a higher importance rank); $e_{ij}$ represents the synaptic edge weight connecting the $i^{th}$ input feature of the input layer 302 to the $j^{th}$ hidden neuron in the first hidden layer 304; and $W^{(1)}$ signifies the total set of input-to-hidden layer edge weights 306. For example, in the illustration of FIG. 3, for a first neuron 308 in the input layer 302, there are two edges, one edge connecting the neuron 308 to a neuron 310 in the first hidden layer 304, and a second edge connecting the neuron 308 to a neuron 312 in the first hidden layer 304. The respective edge weights for these two edges would be summed to provide the feature selection score for the neuron 308. In embodiments, this process can be executed several times (or augmented with a similar, pseudo-ensembling technique like Dropout) for improved robustness. Of note, while there are 5 neurons illustrated for several of the layers in FIG. 3, the dimensions of the layers are typically much larger (e.g., as determined by the layer dimensions 116 in FIG. 1B).

Once the $$f_{rank}^{(i)}$$

scores are computed for each neuron in the input layer 302, the scores are ranked (e.g., high-to-low) to produce the feature selection ranking 135. In embodiments, the top-k scores are selected for the feature selection ranking 135, where in some embodiments k is determined by the threshold ranking parameter 131.

Figure 4B:
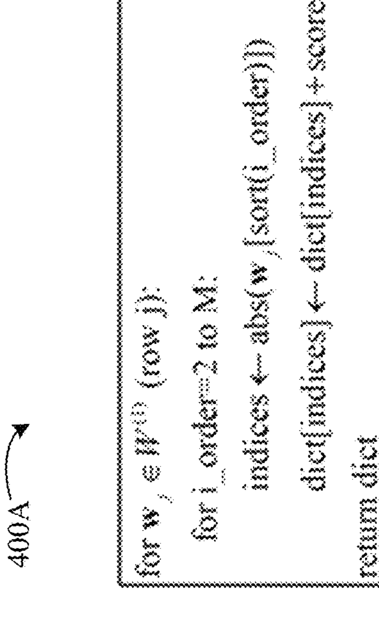
FIGS. 4A-4B provide diagrams illustrating an example process for generating a feature set dictionary according to one or more embodiments.
Figure 4B:
Figure 4A:
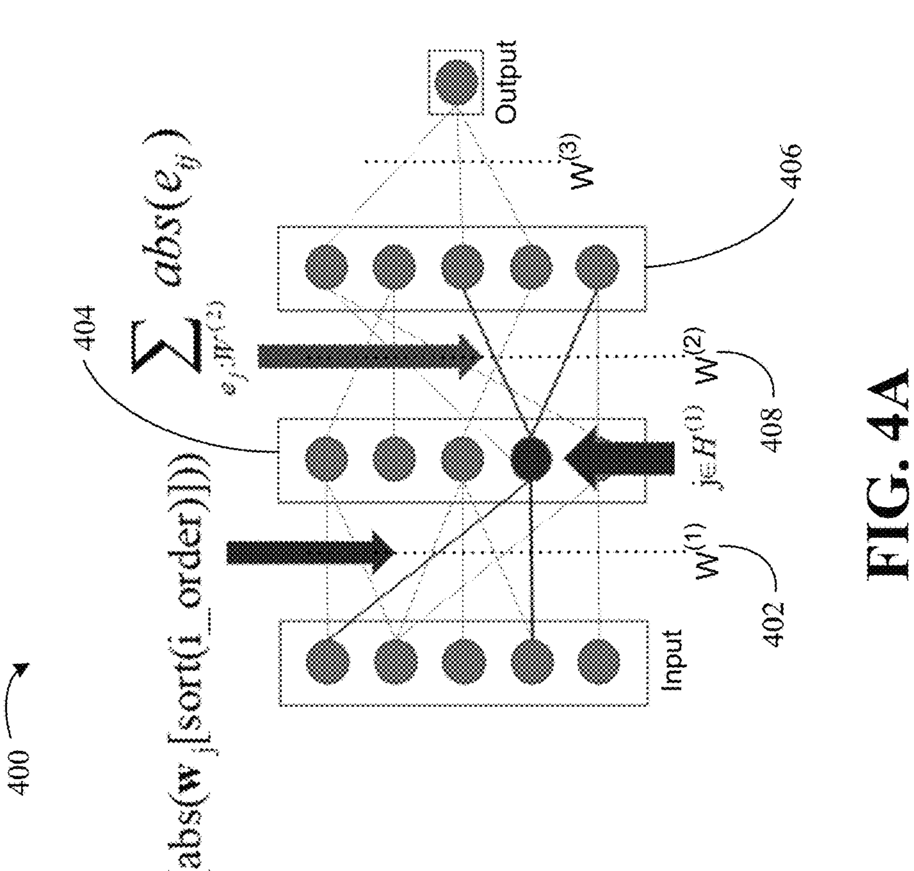

FIGS. 4A-4B provide diagrams illustrating an example process 400 for generating a feature set dictionary according to one or more embodiments, with reference to components and features described herein including but not limited to the figures and associated description. The process 400 can generally be implemented in the feature set dictionary generator 160 (FIGS. 1B-1C, already discussed). More particularly, the process 400 can be implemented in one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out the process 400 can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The process 400 computes a score for each unique set of feature interactions using the sparse NN (e.g., the sparse NN 128 in FIGS. 1C and/or the sparse NN 158 in FIG. 1B). The number of interactions is upper bounded by the width (e.g., dimension) of the first hidden layer of the NN). In embodiments, the feature interaction score is based on the following equation (with reference to FIG. 4A):

$$\text{score}(\text{indices}) = \min(\text{abs}(w_j[\text{sort}(\text{i\_order})]))\cdot\sum_{e_j:W^{(2)}}\text{abs}(e_{ij}) \tag{3}$$

where scores(indices) denotes the score of each feature interaction set; $w_j$ represents a weight vector, namely the $j^{th}$ row of the input weights $W^{(1)}$ (label 402); i_order is a variable ranging from 2 to the desired interaction order (e.g., the order parameter 161 in FIGS. 1B-1C); $e_{ij}$ represents the synaptic edge weight connecting the $i^{th}$ hidden neuron of the first hidden layer $H^{(1)}$ (label 404) to the $j^{th}$ hidden neuron in the second hidden layer 406; and $W^{(2)}$ signifies the total set of edge weights 408 between the first and second hidden layers. Of note, while there are 5 neurons illustrated for several of the layers in FIG. 4A, the dimensions of the layers are typically much larger (e.g., as determined by the layer dimensions 116 in FIG. 1B).

Equation (3) includes two main factors. The left-most factor in Equation (3), min $(\text{abs}(w_j[\text{sort}(i_{order})]))$ represents sorting the elements of the weight vector $w_j$ according to absolute magnitude, then retaining the top i_order values (e.g., the top-2 values when the order parameter is equal to 2, or the top-3 values when the order parameter is equal to 3, etc.) after sorting. This set of sorted values provides the current feature interaction set dictionary entry. The min( ) function provides the minimum of these values. This value is considered as a good representative measure of the relative strength of this feature interaction set; an increase of the minimum of the weight vector $w_j$ connotes an increase of the "weakest link" of the interaction set strength, which in embodiments is qualitatively indicative of a stronger overall interaction strength. In some embodiments, a measure other than the min( ) function can be used as a measure of the interaction set.

The right-most factor in Equation (3), $\Sigma_{e_j:W^{(2)}}$ abs$(e_{ij})$, provides a representative measure of the relative importance of the $j^{th}$ neuron (notated $j\in H^{(1)}$) in the first hidden layer 404, relative to the other network neurons. For example, a "heavy flow" neuron—that is, a neuron with high combinatorial relevance—will in general yield a large value for this factor.

Taken together, these two factors in Equation 3 score a set of features according to the strength of their mutual interactions. This equation will generally yield a high interaction score by way of the left-most factor in (3); in addition, high combinatorial relevance of the associated hidden neuron for this set of feature indices, captured by the right-most factor in (3), signifies the overall relevance of this associated neuron per information flow in the network. Hence, when both factors are large, the feature set encapsulates a high degree of mutual interaction and the overall importance of this interactivity is additionally high relative to the network itself. Conversely, when one or both of these factors are small, the feature set should receive a low interaction score.

FIG. 4B provides a summary of the feature interaction learning algorithm 400A that produces a feature set dictionary using Equation (3). As shown in FIG. 4B, the calculation of score(indices), from Equation (3), is determined for each order of feature interactions from order 2 to the desired order M (e.g., corresponding to the order parameter 161). As one example of the sorting aspect, if the weight vector $w_j=\{3, -1, 2.5, -10.4, 15\}$, then $(\text{abs}(w_j[\text{sort}(i_{order})]))$ yields $\{15, 10.4, 3, 2.5, 1\}$. For i_order=3, then the indices in the weight vector $w_j$ corresponding to the top 3 amounts (largest magnitude) are $\{1, 4, 5\}$.

Figure 5A:
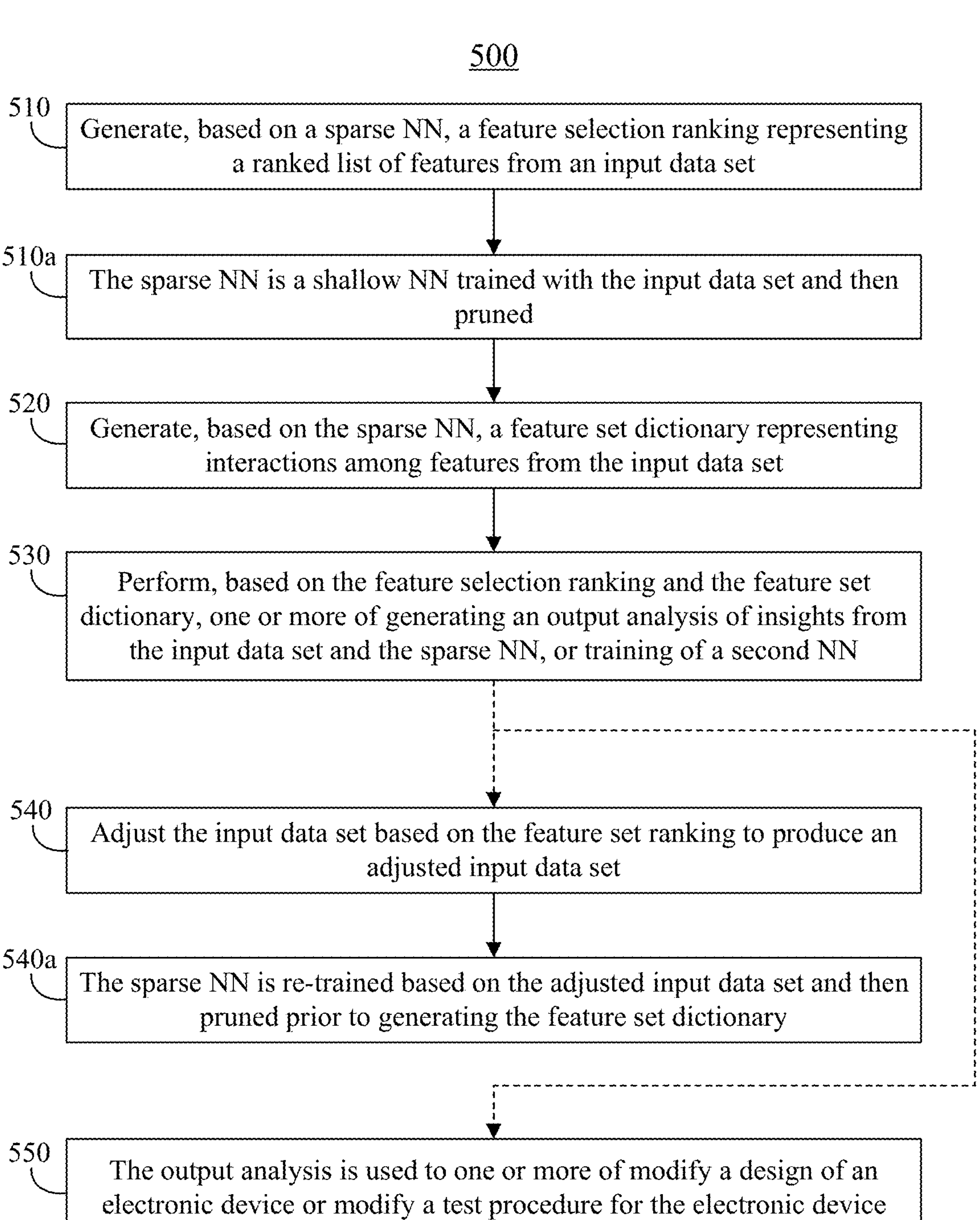
FIGS. 5A-5C provide flow charts illustrating an example method of data analysis according to one or more embodiments.

FIG. 5A provides a flow chart illustrating an example method 500 of performing a data analysis according to one or more embodiments, with reference to components and features described herein including but not limited to the figures and associated description. The method 500 can generally be implemented in the system 100 (FIG. 1A, already discussed), the system 100A (FIGS. 1B and 1D, already discussed), and/or the system 100B (FIGS. 1C and 1D, already discussed). More particularly, the method 500 can be implemented as one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out operations shown in the method 500 and/or functions associated therewith can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 510 provides for generating, based on a sparse neural network, a feature selection ranking representing a ranked list of features from an input data set, where at block 510*a* the sparse neural network is a shallow neural network trained with the input data set and then pruned. Illustrated processing block 520 provides for generating, based on the sparse neural network, a feature set dictionary representing interactions among features from the input data set. Illustrated processing block 530 provides for performing, based on the feature selection ranking and the feature set dictionary, one or more of generating an output analysis of insights from the input data set and the sparse neural network, or training of a second neural network.

In some embodiments, illustrated processing block 540 provides for adjusting the input data set based on the feature set ranking to produce an adjusted input data set, where at block 540*a* the sparse neural network is re-trained based on the adjusted input data set and then pruned prior to generating the feature set dictionary. In some embodiments, illustrated processing block 550 provides that the output analysis is used to one or more of modify a design of an electronic device or modify a test procedure for the electronic device.

Figure 5B:
Figure 5B:
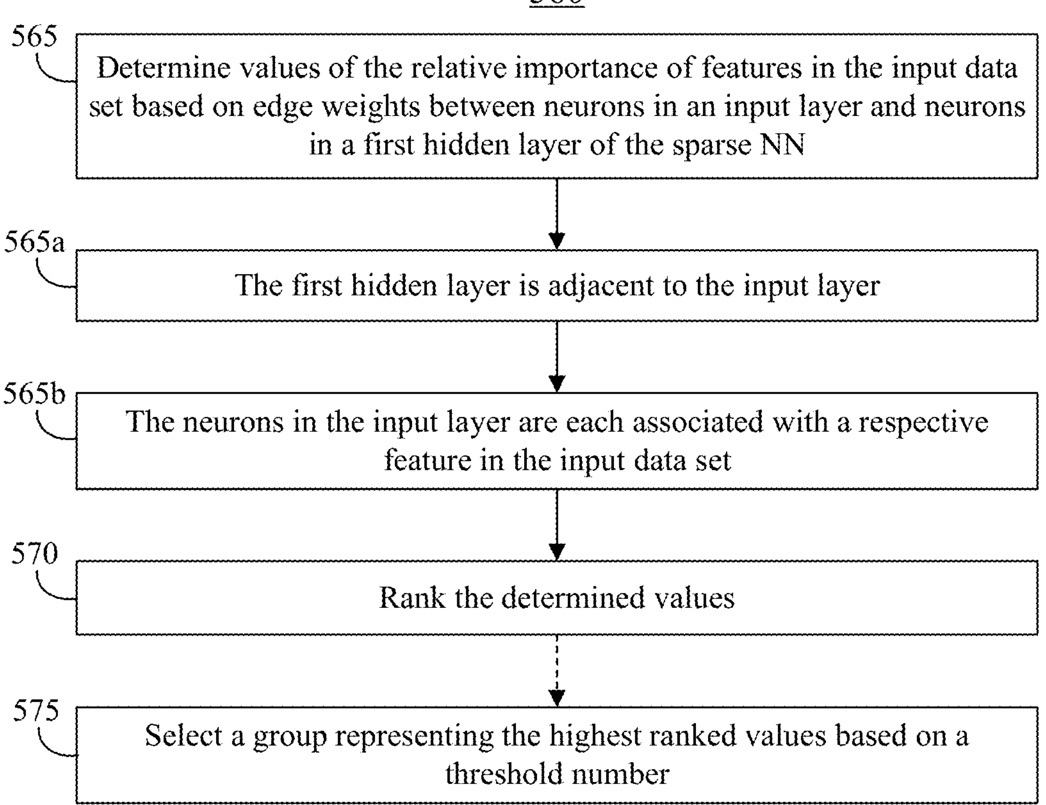

FIG. 5B provides a flow chart illustrating an example method 560 of generating a feature selection ranking according to one or more embodiments, with reference to components and features described herein including but not limited to the figures and associated description. The method 560 can generally be implemented via the feature selection ranking generator 130 (FIGS. 1B and 1C, already discussed). All or portions of the method 560 can be substituted for all or a portion of illustrated processing block 510 (FIG. 5A, already discussed). More particularly, the method 560 can be implemented as one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out operations shown in the method 560 can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 565 provides for determining values of the relative importance of features in the input data set based on edge weights between neurons in an input layer and neurons in a first hidden layer of the sparse neural network, where at block 565*a* the first hidden layer is adjacent to the input layer, and where at block 565*b* the neurons in the input layer are each associated with a respective feature in the input data set. Illustrated processing block 570 provides for ranking the determined values. In some embodiments, illustrated processing block 575 provides for selecting a group representing the highest ranked values based on a threshold number.

Figure 5C:
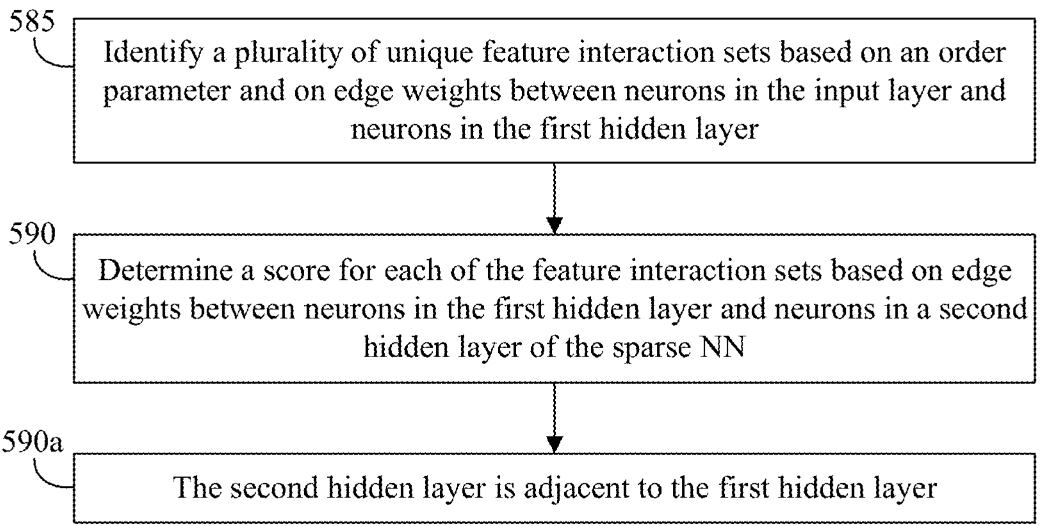

FIG. 5C provides a flow chart illustrating an example method 580 of generating a feature set dictionary according to one or more embodiments, with reference to components and features described herein including but not limited to the figures and associated description. The method 580 can generally be implemented via the feature set dictionary generator 160 (FIGS. 1B and 1C, already discussed). All or portions of the method 580 can be substituted for all or a portion of illustrated processing block 520 (FIG. 5A, already discussed). More particularly, the method 580 can be implemented as one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out operations shown in the method 580 can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 585 provides for identifying a plurality of unique feature interaction sets based on an order parameter and on edge weights between neurons in the input layer and neurons in the first hidden layer. Illustrated processing block 590 provides for determining a score for each of the feature interaction sets based on edge weights between neurons in the first hidden layer and neurons in a second hidden layer of the sparse neural network, where at block 590*a* the second hidden layer is adjacent to the first hidden layer.

Figure 6:
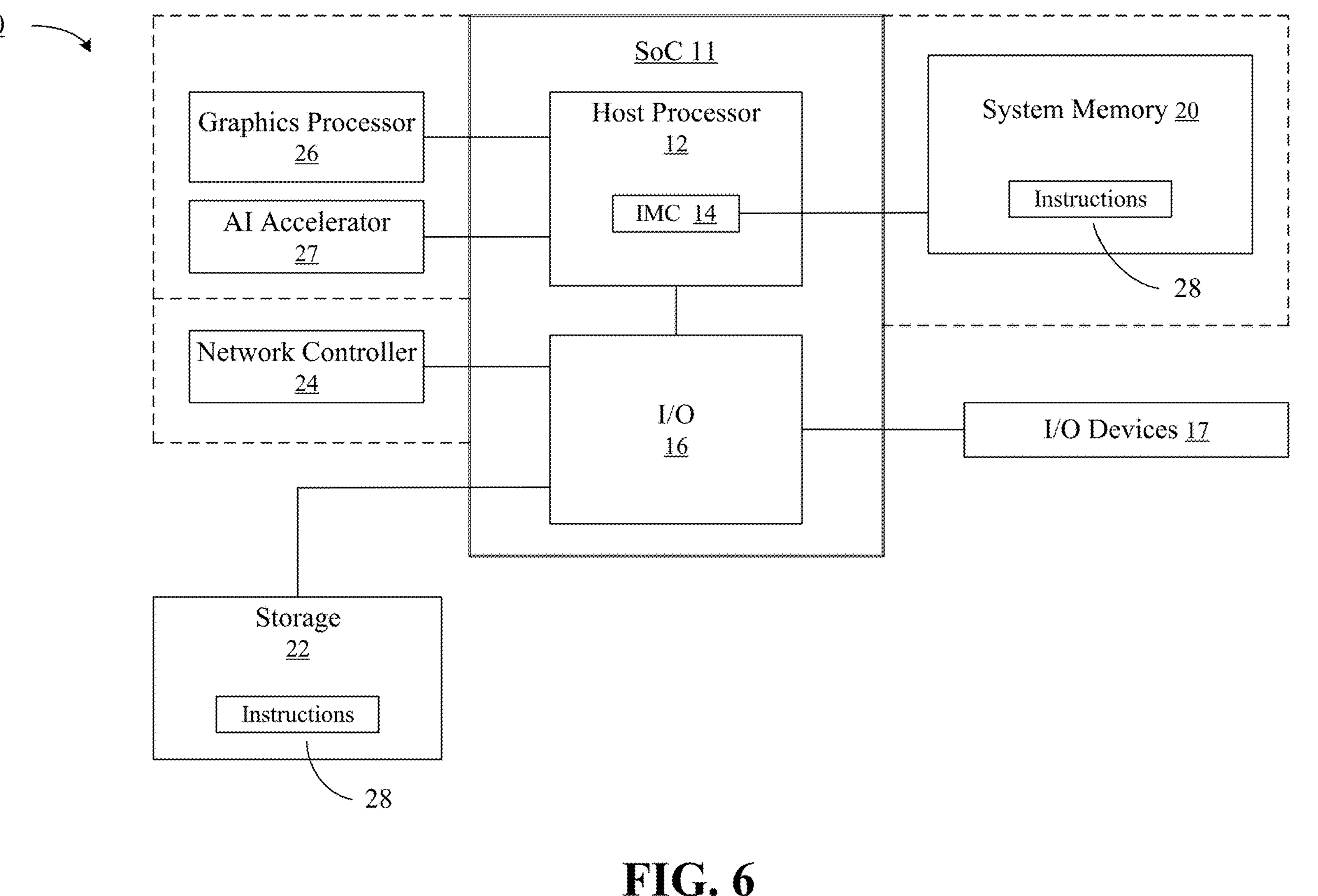
FIG. 6 is a block diagram illustrating an example computing system for data analysis according to one or more embodiments.

FIG. 6 shows a block diagram illustrating an example performance-enhanced computing system 10 for performing data analysis for data sets (such as large or complex data sets) according to one or more embodiments, with reference to components and features described herein including but not limited to the figures and associated description. The system 10 can generally be part of an electronic device/platform having computing and/or communications functionality (e.g., a server, cloud infrastructure controller, database controller, notebook computer, desktop computer, personal digital assistant/PDA, tablet computer, convertible tablet, smart phone, etc.), imaging functionality (e.g., camera, camcorder), media playing functionality (e.g., smart television/TV), wearable functionality (e.g., watch, eyewear, headwear, footwear, jewelry, or other wearable devices), vehicular functionality (e.g., car, truck, motorcycle), robotic functionality (e.g., robot or autonomous robot), Internet of Things (IoT) functionality, etc., or any combination thereof. In the illustrated example, the system 10 can include a host processor 12 (e.g., central processing unit/CPU) having an integrated memory controller (WIC) 14 that can be coupled to system memory 20. The host processor 12 can include any type of processing device, such as, e.g., microcontroller, microprocessor, RISC processor, ASIC, etc., along with associated processing modules or circuitry. The system memory 20 can include any non-transitory machine- or computer-readable storage medium such as RAM, ROM, PROM, EEPROM, firmware, flash memory, etc., configurable logic such as, for example, PLAs, FPGAs, CPLDs, fixed-functionality hardware logic using circuit technology such as, for example, ASIC, CMOS or TTL technology, or any combination thereof suitable for storing instructions 28.

The system 10 can also include an input/output (I/O) module 16. The I/O module 16 can communicate with for example, one or more input/output (I/O) devices 17, a network controller 24 (e.g., wired and/or wireless NIC), and storage 22. The storage 22 can be comprised of any appropriate non-transitory machine- or computer-readable memory type (e.g., flash memory, DRAM, SRAM (static random access memory), solid state drive (SSD), hard disk drive (HDD), optical disk, etc.). The storage 22 can include mass storage. In some embodiments, the host processor 12 and/or the I/O module 16 can communicate with the storage 22 (all or portions thereof) via a network controller 24. In some embodiments, the system 10 can also include a graphics processor 26 (e.g., a graphics processing unit/GPU). In some embodiments, the system 10 can also include a graphics processor 26 (e.g., a graphics processing unit/GPU) and/or an AI accelerator 27.

The host processor 12 and the I/O module 16 can be implemented together on a semiconductor die as a system on chip (SoC) 11, shown encased in a solid line. The SoC 11 can therefore operate as a computing apparatus for performing data analysis for data sets (such as large or complex data sets). In some embodiments, the SoC 11 can also include one or more of the system memory 20, the network controller 24, and/or the graphics processor 26 (shown encased in dotted lines). In some embodiments, the SoC 11 can also include other components of the system 10.

The host processor 12 and/or the I/O module 16 can execute program instructions 28 retrieved from the system memory 20 and/or the storage 22 to perform one or more aspects of the process 200 (FIG. 2), the process 300 (FIG. 3), the process 400 (FIGS. 4A-4B), the method 500 (FIG. 5A), the method 560 (FIG. 5B), and/or the method 580 (FIG. 5C). The system 10 can implement one or more aspects of the system 100, the system 100A, and/or the system 100B as described herein with reference to FIGS. 1A-1D. The system 10 is therefore considered to be performance-enhanced at least to the extent that the technology provides the ability to learn feature importance and feature interactions to capture insights from large or complex data sets or to train machine learning models of arbitrary size or configuration.

Computer program code to carry out the processes described above can be written in any combination of one or more programming languages, including an object-oriented programming language such as JAVA, JAVASCRIPT, PYTHON, SMALLTALK, C++ or the like and/or conventional procedural programming languages, such as the "C" programming language or similar programming languages, and implemented as program instructions 28. Additionally, program instructions 28 can include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, microprocessor, etc.).

I/O devices 17 can include one or more of input devices, such as a touchscreen, keyboard, mouse, cursor-control device, microphone, digital camera, video recorder, camcorder, biometric scanners and/or sensors; input devices can be used to enter information and interact with system 10 and/or with other devices. The I/O devices 17 can also include one or more of output devices, such as a display (e.g., touchscreen, liquid crystal display/LCD, light emitting diode/LED display, plasma panels, etc.), speakers and/or other visual or audio output devices. The input and/or output devices can be used, e.g., to provide a user interface.

Figure 7:
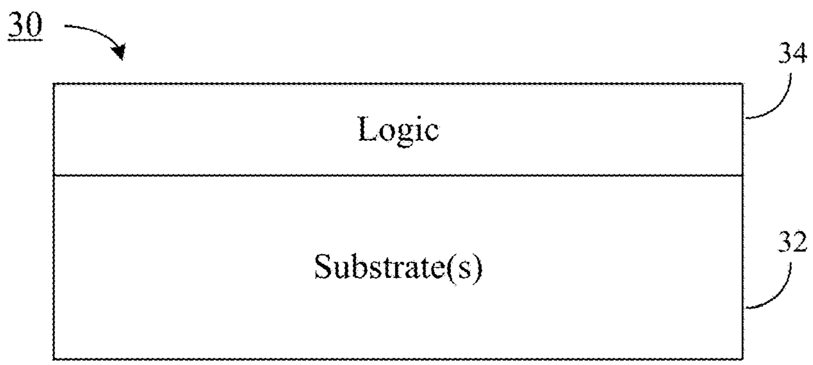
FIG. 7 is a block diagram illustrating an example semiconductor apparatus according to one or more embodiments.

FIG. 7 shows a block diagram illustrating an example semiconductor apparatus 30 for performing data analysis for data sets (such as large or complex data sets) according to one or more embodiments, with reference to components and features described herein including but not limited to the figures and associated description. The semiconductor apparatus 30 can be implemented, e.g., as a chip, die, or other semiconductor package. The semiconductor apparatus 30 can include one or more substrates 32 comprised of, e.g., silicon, sapphire, gallium arsenide, etc. The semiconductor apparatus 30 can also include logic 34 comprised of, e.g., transistor array(s) and other integrated circuit (IC) components) coupled to the substrate(s) 32. The logic 34 can be implemented at least partly in configurable logic or fixed-functionality logic hardware. The logic 34 can implement the system on chip (SoC) 11 described above with reference to FIG. 6. The logic 34 can implement one or more aspects of the processes described above, including process the process 200, the process 300, the process 400, the method 500, the method 560, and/or the method 580. The logic 34 can implement one or more aspects of the system 100, the system 100A, and/or the system 100B as described herein with reference to FIGS. 1A-1D. The apparatus 30 is therefore considered to be performance-enhanced at least to the extent that the technology provides the ability to learn feature importance and feature interactions to capture insights from large or complex data sets or to train machine learning models of arbitrary size or configuration.

The semiconductor apparatus 30 can be constructed using any appropriate semiconductor manufacturing processes or techniques. For example, the logic 34 can include transistor channel regions that are positioned (e.g., embedded) within the substrate(s) 32. Thus, the interface between the logic 34 and the substrate(s) 32 may not be an abrupt junction. The logic 34 can also be considered to include an epitaxial layer that is grown on an initial wafer of the substrate(s) 34.

Figure 8:
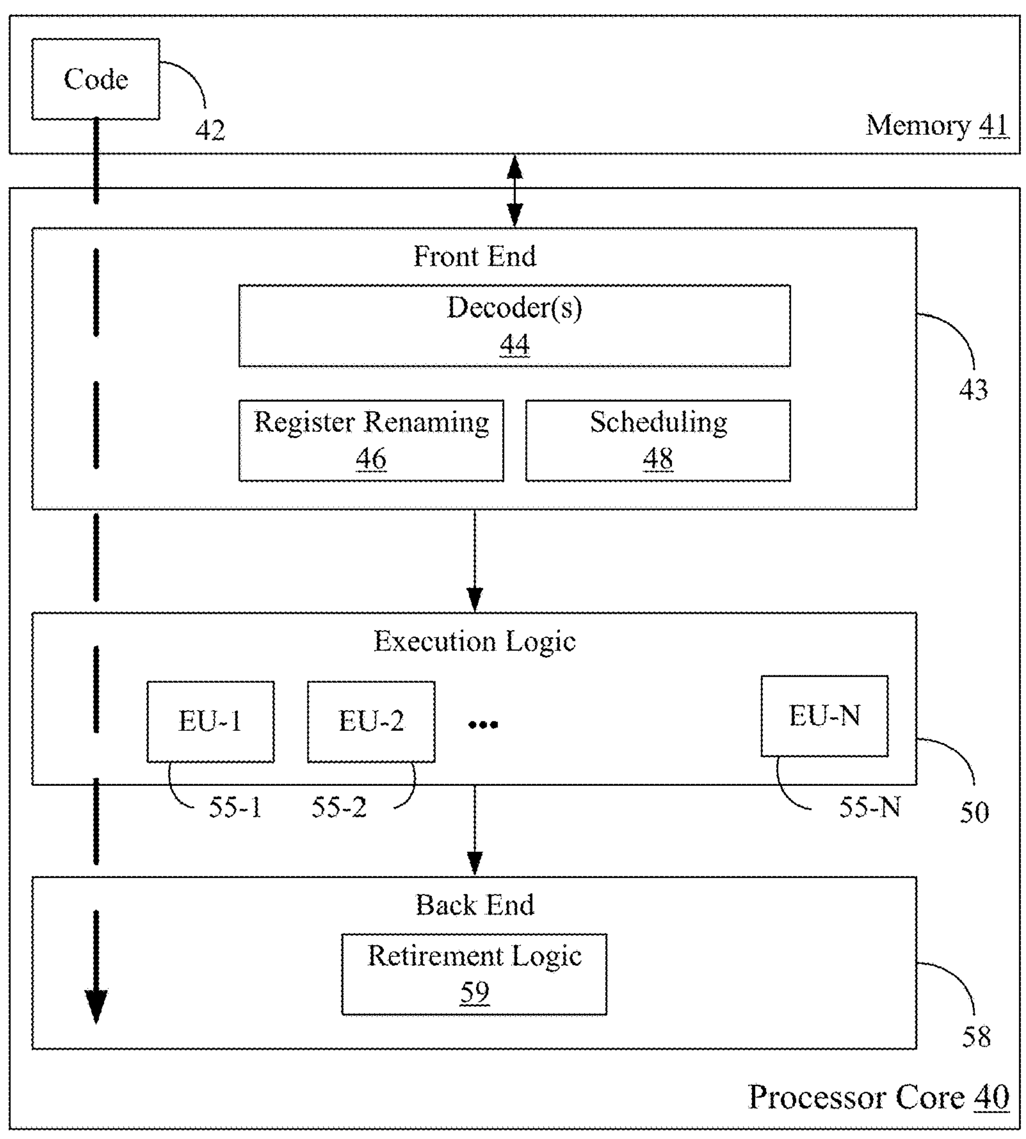
FIG. 8 is a block diagram illustrating an example processor according to one or more embodiments.

FIG. 8 is a block diagram illustrating an example processor core 40 according to one or more embodiments, with reference to components and features described herein including but not limited to the figures and associated description. The processor core 40 can be the core for any type of processor, such as a micro-processor, an embedded processor, a digital signal processor (DSP), a network processor, a graphics processing unit (GPU), or other device to execute code. Although only one processor core 40 is illustrated in FIG. 8, a processing element can alternatively include more than one of the processor core 40 illustrated in FIG. 8. The processor core 40 can be a single-threaded core or, for at least one embodiment, the processor core 40 can be multithreaded in that it can include more than one hardware thread context (or "logical processor") per core.

FIG. 8 also illustrates a memory 41 coupled to the processor core 40. The memory 41 can be any of a wide variety of memories (including various layers of memory hierarchy) as are known or otherwise available to those of skill in the art. The memory 41 can include one or more code 42 instruction(s) to be executed by the processor core 40. The code 42 can implement one or more aspects of the process 200, the process 300, the process 400, the method 500, the method 560, and/or the method 580 described above. The processor core 40 can implement one or more aspects of the system 100, the system 100A, and/or the system 100B as described herein with reference to FIGS. 1A-1D. The processor core 40 can follow a program sequence of instructions indicated by the code 42. Each instruction can enter a front end portion 43 and be processed by one or more decoders 44. The decoder 44 can generate as its output a micro operation such as a fixed width micro operation in a predefined format, or can generate other instructions, microinstructions, or control signals which reflect the original code instruction. The illustrated front end portion 43 also includes register renaming logic 46 and scheduling logic 48, which generally allocate resources and queue the operation corresponding to the convert instruction for execution.

The processor core 40 is shown including execution logic 50 having a set of execution units 55-1 through 55-N. Some embodiments can include a number of execution units dedicated to specific functions or sets of functions. Other embodiments can include only one execution unit or one execution unit that can perform a particular function. The illustrated execution logic 50 performs the operations specified by code instructions.

After completion of execution of the operations specified by the code instructions, back end logic 58 retires the instructions of code 42. In one embodiment, the processor core 40 allows out of order execution but requires in order retirement of instructions. Retirement logic 59 can take a variety of forms as known to those of skill in the art (e.g., re-order buffers or the like). In this manner, the processor core 40 is transformed during execution of the code 42, at least in terms of the output generated by the decoder, the hardware registers and tables utilized by the register renaming logic 46, and any registers (not shown) modified by the execution logic 50.

Although not illustrated in FIG. 8, a processing element can include other elements on chip with the processor core 40. For example, a processing element can include memory control logic along with the processor core 40. The processing element can include I/O control logic and/or can include I/O control logic integrated with memory control logic. The processing element can also include one or more caches.

Figure 9:
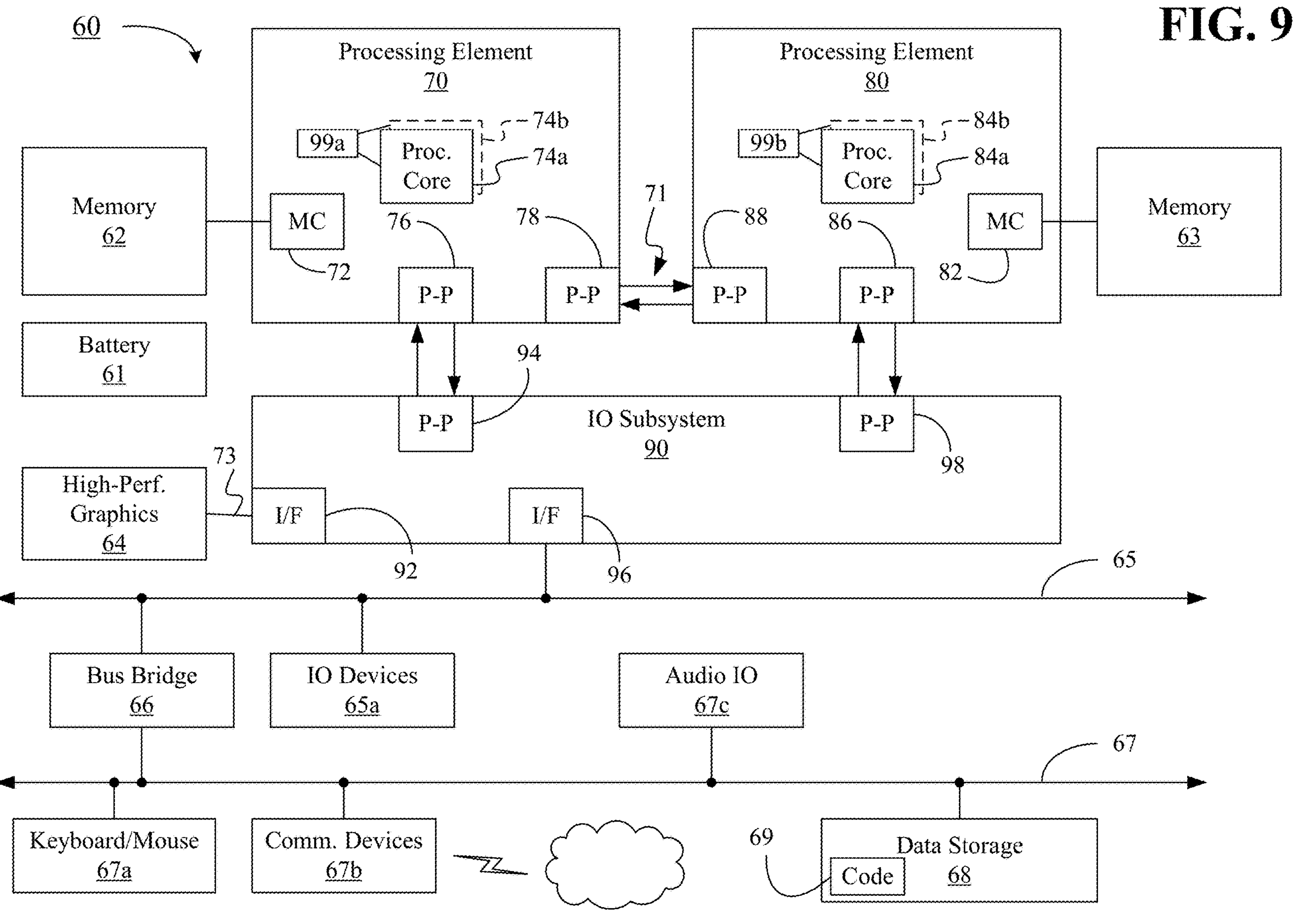
FIG. 9 is a block diagram illustrating an example of a multiprocessor-based computing system according to one or more embodiments.

FIG. 9 is a block diagram illustrating an example of a multi-processor based computing system 60 according to one or more embodiments, with reference to components and features described herein including but not limited to the figures and associated description. The multiprocessor system 60 includes a first processing element 70 and a second processing element 80. While two processing elements 70 and 80 are shown, it is to be understood that an embodiment of the system 60 can also include only one such processing element.

The system 60 is illustrated as a point-to-point interconnect system, wherein the first processing element 70 and the second processing element 80 are coupled via a point-to-point interconnect 71. It should be understood that any or all of the interconnects illustrated in FIG. 9 can be implemented as a multi-drop bus rather than point-to-point interconnect.

As shown in FIG. 9, each of the processing elements 70 and 80 can be multicore processors, including first and second processor cores (i.e., processor cores 74*a* and 74*b* and processor cores 84*a* and 84*b*). Such cores 74*a*, 74*b*, 84*a*, 84*b* can be configured to execute instruction code in a manner similar to that discussed above in connection with FIG. 8.

Each processing element 70, 80 can include at least one shared cache 99*a*, 99*b*. The shared cache 99*a*, 99*b* can store data (e.g., instructions) that are utilized by one or more components of the processor, such as the cores 74*a*, 74*b* and 84*a*, 84*b*, respectively. For example, the shared cache 99*a*, 99*b* can locally cache data stored in a memory 62, 63 for faster access by components of the processor. In one or more embodiments, the shared cache 99*a*, 99*b* can include one or more mid-level caches, such as level 2 (L2), level 3 (L3), level 4 (L4), or other levels of cache, a last level cache (LLC), and/or combinations thereof.

While shown with only two processing elements 70, 80, it is to be understood that the scope of the embodiments is not so limited. In other embodiments, one or more additional processing elements can be present in a given processor. Alternatively, one or more of the processing elements 70, 80 can be an element other than a processor, such as an accelerator or a field programmable gate array. For example, additional processing element(s) can include additional processors(s) that are the same as a first processor 70, additional processor(s) that are heterogeneous or asymmetric to processor a first processor 70, accelerators (such as, e.g., graphics accelerators or digital signal processing (DSP) units), field programmable gate arrays, or any other processing element. There can be a variety of differences between the processing elements 70, 80 in terms of a spectrum of metrics of merit including architectural, micro architectural, thermal, power consumption characteristics, and the like. These differences can effectively manifest themselves as asymmetry and heterogeneity amongst the processing elements 70, 80. For at least one embodiment, the various processing elements 70, 80 can reside in the same die package.

The first processing element 70 can further include memory controller logic (MC) 72 and point-to-point (P-P) interfaces 76 and 78. Similarly, the second processing element 80 can include a MC 82 and P-P interfaces 86 and 88. As shown in FIG. 9, MC's 72 and 82 couple the processors to respective memories, namely a memory 62 and a memory 63, which can be portions of main memory locally attached to the respective processors. While the MC 72 and 82 is illustrated as integrated into the processing elements 70, 80, for alternative embodiments the MC logic can be discrete logic outside the processing elements 70, 80 rather than integrated therein.

The first processing element 70 and the second processing element 80 can be coupled to an I/O subsystem 90 via P-P interconnects 76 and 86, respectively. As shown in FIG. 9, the I/O subsystem 90 includes P-P interfaces 94 and 98. Furthermore, the I/O subsystem 90 includes an interface 92 to couple I/O subsystem 90 with a high performance graphics engine 64. In one embodiment, a bus 73 can be used to couple the graphics engine 64 to the I/O subsystem 90. Alternately, a point-to-point interconnect can couple these components.

In turn, the I/O subsystem 90 can be coupled to a first bus 65 via an interface 96. In one embodiment, the first bus 65 can be a Peripheral Component Interconnect (PCI) bus, or a bus such as a PCI Express bus or another third generation I/O interconnect bus, although the scope of the embodiments are not so limited.

As shown in FIG. 9, various I/O devices 65*a* (e.g., biometric scanners, speakers, cameras, and/or sensors) can be coupled to the first bus 65, along with a bus bridge 66 which can couple the first bus 65 to a second bus 67. In one embodiment, the second bus 67 can be a low pin count (LPC) bus. Various devices can be coupled to the second bus 67 including, for example, a keyboard/mouse 67*a*, communication device(s) 67*b*, and a data storage unit 68 such as a disk drive or other mass storage device which can include code 69, in one embodiment. The illustrated code 69 can implement one or more aspects of the processes described above, including the process 200, the process 300, the process 400, the method 500, the method 560, and/or the method 580. The illustrated code 69 can be similar to the code 42 (FIG. 8), already discussed. Further, an audio I/O 67*c* can be coupled to second bus 67 and a battery 61 can supply power to the computing system 60. The system 60 can implement one or more aspects of the system 100, the system 100A, and/or the system 100B as described herein with reference to FIGS. 1A-1D.

Note that other embodiments are contemplated. For example, instead of the point-to-point architecture of FIG. 9, a system can implement a multi-drop bus or another such communication topology. Also, the elements of FIG. 9 can alternatively be partitioned using more or fewer integrated chips than shown in FIG. 9.

Embodiments of each of the above systems, devices, components and/or methods, including the system 100, the system 100A, the system 100B, the process 200, the process 300, the process 400, the method 500, the method 560, and/or the method 580, and/or any other system components, can be implemented in hardware, software, or any suitable combination thereof. For example, hardware implementations may include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Alternatively, or additionally, all or portions of the foregoing systems and/or components and/or methods can be implemented in one or more modules as a set of program or logic instructions stored in a machine- or computer-readable storage medium such as RAM, ROM, PROM, firmware, flash memory, etc., to be executed by a processor or computing device. For example, computer program code to carry out the operations of the components can be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

Additional Notes and Examples

Example S1 includes a performance-enhanced computing system comprising a processor, and memory coupled to the processor, the memory to store instructions which, when executed by the processor, cause the computing system to generate, based on a sparse neural network, a feature selection ranking representing a ranked list of features from an input data set, wherein the sparse neural network is a shallow neural network trained with the input data set and then pruned, generate, based on the sparse neural network, a feature set dictionary representing interactions among features from the input data set, and perform, based on the feature selection ranking and the feature set dictionary, one or more of generating an output analysis of insights from the input data set and the sparse neural network, or training of a second neural network.

Example S2 includes the system of Example S1, wherein to generate the feature selection ranking, the instructions cause the computing system to determine values of a relative importance of features from the input data set based on edge weights between neurons in an input layer and neurons in a first hidden layer of the sparse neural network, wherein the first hidden layer is adjacent to the input layer, and wherein the neurons in the input layer are each associated with a respective feature in the input data set, and rank the determined values.

Example S3 includes the system of Example S1 or S2, wherein to generate the feature selection ranking, the instructions further cause the computing system to select a group representing the highest ranked values based on a threshold number.

Example S4 includes the system of Example S1, S2 or S3, wherein to generate the feature set dictionary, the instructions cause the computing system to identify a plurality of unique feature interaction sets based on an order parameter and on edge weights between neurons in the input layer and neurons in the first hidden layer, and determine a score for each of the feature interaction sets based on edge weights between neurons in the first hidden layer and neurons in a second hidden layer of the sparse neural network, wherein the second hidden layer is adjacent to the first hidden layer.

Example S5 includes the system of any of Examples S1-S4, wherein the instructions further cause the computing system to adjust the input data set based on the feature set ranking to produce an adjusted input data set, and wherein the sparse neural network is re-trained based on the adjusted input data set and then pruned prior to generating the feature set dictionary.

Example S6 includes the system of any of Examples S1-55, wherein the sparse neural network is a shallow neural network having a number of layers in the range of three to ten layers.

Example S7 includes the system of any of Examples S1-S6, wherein the insights represent learnings about the features from the input data and the interactions between the features to provide predictive information.

Example S8 includes the system of any of Examples S1-S7, wherein the insights relate to one or more of physical phenomena or physical properties associated with a product or procedures for manufacturing, testing or use of the product.

Example S9 includes the system of any of Examples S1-S8, wherein the output analysis is used to one or more of modify a design of an electronic device or modify a test procedure for the electronic device.

Example A1 includes a semiconductor apparatus comprising one or more substrates, and logic coupled to the one or more substrates, wherein the logic is implemented at least partly in one or more of configurable logic or fixed-functionality hardware logic, the logic to generate, based on a sparse neural network, a feature selection ranking representing a ranked list of features from an input data set, wherein the sparse neural network is a shallow neural network trained with the input data set and then pruned, generate, based on the sparse neural network, a feature set dictionary representing interactions among features from the input data set, and perform, based on the feature selection ranking and the feature set dictionary, one or more of generating an output analysis of insights from the input data set and the sparse neural network, or training of a second neural network.

Example A2 includes the apparatus of Example A1, wherein to generate the feature selection ranking, the logic is to determine values of a relative importance of features from the input data set based on edge weights between neurons in an input layer and neurons in a first hidden layer of the sparse neural network, wherein the first hidden layer is adjacent to the input layer, and wherein the neurons in the input layer are each associated with a respective feature in the input data set, and rank the determined values.

Example A3 includes the apparatus of Example A1 or A2, wherein to generate the feature selection ranking, the logic is further to select a group representing the highest ranked values based on a threshold number.

Example A4 includes the apparatus of Example A1, A2 or A3, wherein to generate the feature set dictionary, the logic is to identify a plurality of unique feature interaction sets based on an order parameter and on edge weights between neurons in the input layer and neurons in the first hidden layer, and determine a score for each of the feature interaction sets based on edge weights between neurons in the first hidden layer and neurons in a second hidden layer of the sparse neural network, wherein the second hidden layer is adjacent to the first hidden layer.

Example A5 includes the apparatus of any of Examples A1-A4, wherein the logic is further to adjust the input data set based on the feature set ranking to produce an adjusted input data set, and wherein the sparse neural network is re-trained based on the adjusted input data set and then pruned prior to generating the feature set dictionary.

Example A6 includes the apparatus of any of Examples A1-A5, wherein the sparse neural network is a shallow neural network having a number of layers in the range of three to ten layers.

Example A7 includes the apparatus of any of Examples A1-A6, wherein the insights represent learnings about the features from the input data and the interactions between the features to provide predictive information.

Example A8 includes the apparatus of any of Examples A1-A7, wherein the insights relate to one or more of physical phenomena or physical properties associated with a product or procedures for manufacturing, testing or use of the product.

Example A9 includes the apparatus of any of Examples A1-A8, wherein the output analysis is used to one or more of modify a design of an electronic device or modify a test procedure for the electronic device.

Example A10 includes the apparatus of any of Examples A1-A9, wherein the logic coupled to the one or more substrates includes transistor channel regions that are positioned within the one or more substrates.

Example C1 includes at least one computer readable storage medium comprising a set of instructions which, when executed by a computing system, cause the computing system to generate, based on a sparse neural network, a feature selection ranking representing a ranked list of features from an input data set, wherein the sparse neural network is a shallow neural network trained with the input data set and then pruned, generate, based on the sparse neural network, a feature set dictionary representing interactions among features from the input data set, and perform, based on the feature selection ranking and the feature set dictionary, one or more of generating an output analysis of insights from the input data set and the sparse neural network, or training of a second neural network.

Example C2 includes the at least one computer readable storage medium of Example C1, wherein to generate the feature selection ranking, the instructions cause the computing system to determine values of a relative importance of features from the input data set based on edge weights between neurons in an input layer and neurons in a first hidden layer of the sparse neural network, wherein the first hidden layer is adjacent to the input layer, and wherein the neurons in the input layer are each associated with a respective feature in the input data set, and rank the determined values.

Example C3 includes the at least one computer readable storage medium of Example C1 or C2, wherein to generate the feature selection ranking, the instructions further cause the computing system to select a group representing the highest ranked values based on a threshold number.

Example C4 includes the at least one computer readable storage medium of Example C1, C2 or C3, wherein to generate the feature set dictionary, the instructions cause the computing system to identify a plurality of unique feature interaction sets based on an order parameter and on edge weights between neurons in the input layer and neurons in the first hidden layer, and determine a score for each of the feature interaction sets based on edge weights between neurons in the first hidden layer and neurons in a second hidden layer of the sparse neural network, wherein the second hidden layer is adjacent to the first hidden layer.

Example C5 includes the at least one computer readable storage medium of any of Examples C1-C4, wherein the instructions further cause the computing system to adjust the input data set based on the feature set ranking to produce an adjusted input data set, and wherein the sparse neural network is re-trained based on the adjusted input data set and then pruned prior to generating the feature set dictionary.

Example C6 includes the at least one computer readable storage medium of any of Examples C1-C5, wherein the sparse neural network is a shallow neural network having a number of layers in the range of three to ten layers.

Example C7 includes the at least one computer readable storage medium of any of Examples C1-C6, wherein the insights represent learnings about the features from the input data and the interactions between the features to provide predictive information.

Example C8 includes the at least one computer readable storage medium of any of Examples C1-C7, wherein the insights relate to one or more of physical phenomena or physical properties associated with a product or procedures for manufacturing, testing or use of the product.

Example C9 includes the at least one computer readable storage medium of any of Examples C1-C8, wherein the output analysis is used to one or more of modify a design of an electronic device or modify a test procedure for the electronic device.

Example M1 includes a method comprising generating, based on a sparse neural network, a feature selection ranking representing a ranked list of features from an input data set, wherein the sparse neural network is a shallow neural network trained with the input data set and then pruned, generating, based on the sparse neural network, a feature set dictionary representing interactions among features from the input data set, and performing, based on the feature selection ranking and the feature set dictionary, one or more of generating an output analysis of insights from the input data set and the sparse neural network, or training of a second neural network.

Example M2 includes the method of Example M1, wherein generating the feature selection ranking comprises determining values of a relative importance of features from the input data set based on edge weights between neurons in an input layer and neurons in a first hidden layer of the sparse neural network, wherein the first hidden layer is adjacent to the input layer, and wherein the neurons in the input layer are each associated with a respective feature in the input data set, and ranking the determined values.

Example M3 includes the method of Example M1 or M2, wherein generating the feature selection ranking further comprises selecting a group representing the highest ranked values based on a threshold number.

Example M4 includes the method of Example M1, M2 or M3, wherein generating the feature set dictionary comprises identifying a plurality of unique feature interaction sets based on an order parameter and on edge weights between neurons in the input layer and neurons in the first hidden layer, and determining a score for each of the feature interaction sets based on edge weights between neurons in the first hidden layer and neurons in a second hidden layer of the sparse neural network, wherein the second hidden layer is adjacent to the first hidden layer.

Example M5 includes the method of any of Examples M1-M4, further comprising adjusting the input data set based on the feature set ranking to produce an adjusted input data set, wherein the sparse neural network is re-trained based on the adjusted input data set and then pruned prior to generating the feature set dictionary.

Example M6 includes the method of any of Examples M1-M5, wherein the sparse neural network is a shallow neural network having a number of layers in the range of three to ten layers.

Example M7 includes the method of any of Examples M1-M6, wherein the insights represent learnings about the features from the input data and the interactions between the features to provide predictive information.

Example M8 includes the method of any of Examples M1-M7, wherein the insights relate to one or more of physical phenomena or physical properties associated with a product or procedures for manufacturing, testing or use of the product.

Example M9 includes the method of any of Examples M1-M8, wherein the output analysis is used to one or more of modify a design of an electronic device or modify a test procedure for the electronic device.

Example AM1 includes an apparatus comprising means for performing the method of any one of Examples M1 to M9.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:

a processor; and memory coupled to the processor, the memory to store instructions which, when executed by the processor, cause the computing system to:

generate, based on a sparse neural network, a feature selection ranking representing a ranked list of features from an input data set, wherein the sparse neural network is a shallow neural network trained with the input data set and then pruned;

generate, based on the sparse neural network, a feature set dictionary representing interactions among features from the input data set; and perform, based on the feature selection ranking and the feature set dictionary, one or more of generating an output analysis of insights from the input data set and the sparse neural network, or training of a second neural network.

2. The system of claim 1, wherein to generate the feature selection ranking, the instructions cause the computing system to:

determine values of a relative importance of features from the input data set based on edge weights between neurons in an input layer and neurons in a first hidden layer of the sparse neural network, wherein the first hidden layer is adjacent to the input layer, and wherein the neurons in the input layer are each associated with a respective feature in the input data set; and rank the determined values.

3. The system of claim 2, wherein to generate the feature selection ranking, the instructions further cause the computing system to select a group representing a highest ranked values based on a threshold number.

4. The system of claim 3, wherein to generate the feature set dictionary, the instructions cause the computing system to:

identify a plurality of unique feature interaction sets based on an order parameter and on edge weights between neurons in the input layer and neurons in the first hidden layer; and determine a score for each of the feature interaction sets based on edge weights between neurons in the first hidden layer and neurons in a second hidden layer of the sparse neural network, wherein the second hidden layer is adjacent to the first hidden layer.

5. The system of claim 1, wherein the instructions further cause the computing system to adjust the input data set based on the feature set ranking to produce an adjusted input data set; and wherein the sparse neural network is re-trained based on the adjusted input data set and then pruned prior to generating the feature set dictionary.

6. The system of claim 1, wherein the sparse neural network is a shallow neural network having a number of layers in a range of three to ten layers.

7. The system of claim 1, wherein the insights represent learnings about the features from the input data and the interactions between the features to provide predictive information.

8. The system of claim 7, wherein the insights relate to one or more of physical phenomena or physical properties associated with a product or procedures for manufacturing, testing or use of the product.

9. A semiconductor apparatus comprising:

one or more substrates; and logic coupled to the one or more substrates, wherein the logic is implemented at least partly in one or more of configurable logic or fixed-functionality hardware logic, the logic to:

generate, based on a sparse neural network, a feature selection ranking representing a ranked list of features from an input data set, wherein the sparse neural network is a shallow neural network trained with the input data set and then pruned;

generate, based on the sparse neural network, a feature set dictionary representing interactions among features from the input data set; and perform, based on the feature selection ranking and the feature set dictionary, one or more of generating an output analysis of insights from the input data set and the sparse neural network, or training of a second neural network.

10. The apparatus of claim 9, wherein to generate the feature selection ranking, the logic is to:

determine values of a relative importance of features from the input data set based on edge weights between neurons in an input layer and neurons in a first hidden layer of the sparse neural network, wherein the first hidden layer is adjacent to the input layer, and wherein the neurons in the input layer are each associated with a respective feature in the input data set; and rank the determined values.

11. The apparatus of claim 10, wherein to generate the feature selection ranking, the logic is further to select a group representing a highest ranked values based on a threshold number.

12. The apparatus of claim 11, wherein to generate the feature set dictionary, the logic is to:

identify a plurality of unique feature interaction sets based on an order parameter and on edge weights between neurons in the input layer and neurons in the first hidden layer; and determine a score for each of the feature interaction sets based on edge weights between neurons in the first hidden layer and neurons in a second hidden layer of the sparse neural network, wherein the second hidden layer is adjacent to the first hidden layer.

13. The apparatus of claim 9, wherein the logic is further to adjust the input data set based on the feature set ranking to produce an adjusted input data set; and wherein the sparse neural network is re-trained based on the adjusted input data set and then pruned prior to generating the feature set dictionary.

14. The apparatus of claim 9, wherein the sparse neural network is a shallow neural network having a number of layers in a range of three to ten layers.

15. The apparatus of claim 9, wherein the insights represent learnings about the features from the input data and the interactions between the features to provide predictive information.

16. The apparatus of claim 15, wherein the insights relate to one or more of physical phenomena or physical properties associated with a product or procedures for manufacturing, testing or use of the product.

17. The apparatus of claim 9, wherein the logic coupled to the one or more substrates includes transistor channel regions that are positioned within the one or more substrates.

18. At least one non-transitory computer readable storage medium comprising a set of instructions which, when executed by a computing system, cause the computing system to:

generate, based on a sparse neural network, a feature selection ranking representing a ranked list of features from an input data set, wherein the sparse neural network is a shallow neural network trained with the input data set and then pruned;

generate, based on the sparse neural network, a feature set dictionary representing interactions among features from the input data set; and perform, based on the feature selection ranking and the feature set dictionary, one or more of generating an output analysis of insights from the input data set and the sparse neural network, or training of a second neural network.

19. The at least one non-transitory computer readable storage medium of claim 18, wherein to generate the feature selection ranking, the instructions cause the computing system to:

determine values of a relative importance of features from the input data set based on edge weights between neurons in an input layer and neurons in a first hidden layer of the sparse neural network, wherein the first hidden layer is adjacent to the input layer, and wherein the neurons in the input layer are each associated with a respective feature in the input data set; and rank the determined values.

20. The at least one non-transitory computer readable storage medium of claim 19, wherein to generate the feature selection ranking, the instructions further cause the computing system to select a group representing a highest ranked values based on a threshold number.

21. The at least one non-transitory computer readable storage medium of claim 20, wherein to generate the feature set dictionary, the instructions cause the computing system to:

identify a plurality of unique feature interaction sets based on an order parameter and on edge weights between neurons in the input layer and neurons in the first hidden layer; and determine a score for each of the feature interaction sets based on edge weights between neurons in the first hidden layer and neurons in a second hidden layer of the sparse neural network, wherein the second hidden layer is adjacent to the first hidden layer.

22. The at least one non-transitory computer readable storage medium of claim 18, wherein the instructions further cause the computing system to adjust the input data set based on the feature set ranking to produce an adjusted input data set; and wherein the sparse neural network is re-trained based on the adjusted input data set and then pruned prior to generating the feature set dictionary.

23. The at least one non-transitory computer readable storage medium of claim 18, wherein the sparse neural network is a shallow neural network having a number of layers in a range of three to ten layers.

24. The at least one non-transitory computer readable storage medium of claim 18, wherein the insights represent learnings about the features from the input data and the interactions between the features to provide predictive information.

25. The at least one computer readable storage medium of claim 24, wherein the insights relate to one or more of physical phenomena or physical properties associated with a product or procedures for manufacturing, testing or use of the product.

* * * * *